United States Patent [19]

Wildenrotter

[11] 4,284,061

[45] Aug. 18, 1981

[54] APPARATUS FOR COLLECTING SOLAR ENERGY

[75] Inventor: Karl Wildenrotter, Munich, Fed. Rep. of Germany

[73] Assignee: M.A.N. Maschinenfabrik Augsburg-Nuernberg Aktiengesellschaft, Munich, Fed. Rep. of Germany

[21] Appl. No.: 65,150

[22] Filed: Aug. 9, 1979

[30] Foreign Application Priority Data

Aug. 11, 1978 [DE] Fed. Rep. of Germany ....... 2835348

[51] Int. Cl.$^3$ ............................ F24J 3/02; H01Q 3/00; G02B 5/08
[52] U.S. Cl. .................................. 126/418; 126/424; 343/765; 350/289
[58] Field of Search ............... 126/425, 424, 418, 438; 350/289; 343/765, 766

[56] References Cited

U.S. PATENT DOCUMENTS

| 787,145 | 12/1903 | Brown | 126/438 |
| 2,472,824 | 6/1949 | Hays | 343/765 |
| 3,906,927 | 9/1975 | Caplan | 126/438 |

FOREIGN PATENT DOCUMENTS

| 2524356 | 12/1976 | Fed. Rep. of Germany | 126/438 |
| 2802167 | 7/1979 | Fed. Rep. of Germany | 126/425 |
| 2016675 | 9/1979 | United Kingdom | 126/438 |

Primary Examiner—Samuel Scott
Assistant Examiner—G. Anderson
Attorney, Agent, or Firm—Schwartz, Jeffery, Schwaab, Mack, Blumenthal & Koch

[57] ABSTRACT

Apparatus for collecting solar energy comprises a collector having a solar-energy collector surface. The collector is mounted on a support and is pivotable between an exposed position in which the collector surface faces the sun and a substantially-horizontal sheltered position in which the collector surface faces the earth, thereby protecting the collector surface from the elements and facilitating access thereto for maintenance.

8 Claims, 3 Drawing Figures

APPARATUS FOR COLLECTING SOLAR ENERGY

BACKGROUND OF THE INVENTION

This invention relates to apparatus for collecting solar energy.

It is known to convert solar energy into heat or electric current by means of reflectors used to focus the sun's rays, or by means of solar cells. These are normally combined in large numbers to form a collector having a large surface area exposed to the rays of the sun.

The ideal angle of incidence of the sun-light is adjusted by continuously aiming the collector to suit the prevailing height of the sun. In this arrangement the exposed surface is for the most part turned to the sky, directly exposing it to weather conditions including rain, hail, and also to dust. These factors can be extremely detrimental to the exposed surface of the collector.

SUMMARY OF THE INVENTION

An object of the present invention is to provide apparatus for collecting solar energy in which the surface normally exposed to the sun-light is protected at least temporarily from such weather as may injure the surface.

The present invention comprises apparatus for collecting solar energy comprising collector means having a solar-energy collector surface, support means pivotably supporting said collector means, and means for pivoting said collector means between an exposed position in which said collector surface faces the sun and a substantially-horizontal sheltered position in which said collector surface faces the earth.

In this manner the reflecting surfaces or surfaces of the solar cells are protected by merely pivoting the collector downwardly and so eliminating the need for special covering devices. It is thus also possible to pivot the collector downwardly for the duration of the night to prevent contamination by dust and moisture. This position can be used also for servicing and cleaning the collector because it permits direct access to the entire surface from the ground.

In order to maintain the ideal angle of incidence of the sun-light incident on the collector during the course of the day the collector should be made to track the sun across the sky. For this purpose, the collector is pivotable about a vertical and a horizontal axis. It will be advantageous to use this horizontal axis also for pivotal movement into the sheltered position thereby eliminating the need for additional joints.

To obviate the need for excessively long lever arms the collector may be centrally supported on a pedestal and the central area may be provided with a gap the width of the pedestal, the pedestal extending through the gap when the collector is pivoted to the sheltered position. For this purpose, the collector is pivoted about a horizontal axis extending through the pedestal and traversing the collector horizontally and centrally on its rear side. During the pivoting movement to the sheltered position the reflector halves separated by the gap are carried along the sides of the pedestal until the collector has attained its horizontal position.

In order to minimize the gap, which reduces the energy-collecting surface, the pedestal is made flat and arranged for rotation about the vertical axis together with the collector.

Preferably, the plane of the collector is arranged for rotation through a 180-degree arc. The movement may be effected by means of an electro-mechanical pivot device comprisigng two pivotably-interconnected levers, the free end of the one lever being connected to an electrically operated actuating device, and the free end of the second lever being connected to the collector. The first lever is hinged centrally to the pedestal.

This pivot means, which is simple to construct, permits the collector to be moved reliably and with a minimum of servicing about the horizontal axis for sun-tracking as well as for pivoting it into the sheltered position. Preferably, the levers, the joints of which also have horizontal axes of rotation, move in a vertical plane extending through the gap in the plane of the platform. This prevents collision of the mechanical pivoting device with the collector and so permits the linkage to be designed for best results.

The actuating device may comprise, for example, threaded spindles, chains, racks, etc., driven by an electric motor.

In order to minimize the range of action in the plane of movement of the linkage the first lever, which is connected to the actuating device, is formed by two arms rigidly connected together at an angle less than 180°. The lever may take the shape of a boomerang for adequate stability to sustain the moment forces and to have a maximally flat shape in a direction normal to the pivotal plane.

THE PREFERRED EMBODIMENT

Figure 1:
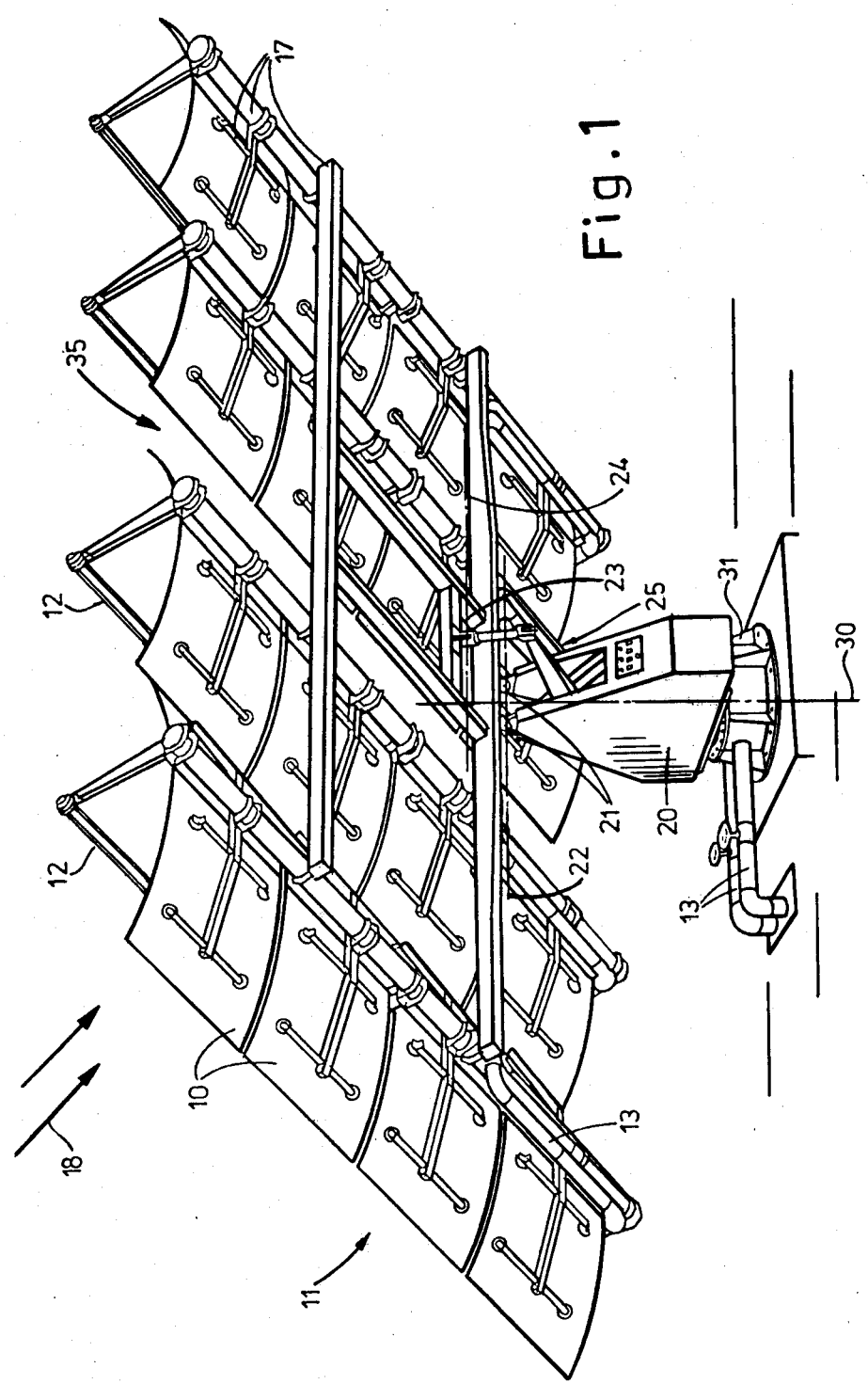
FIG. 1 is a perspective view of apparatus for collecting solar energy according to the invention.

FIG. 1 shows apparatus for collecting solar energy and converting it into thermal energy. It essentially consists of a collector 11, formed by a number of individual reflectors 10, absorber pipes 12 and a pipe system 13 for a medium to carry the heat. The reflectors 10 are cylindrical-parabolic mirrors with their focal line arranged in a north-south direction and with their rear attached to a supporting structure 17. The absorber 12 is arranged in the focal line formed by a number of reflectors 10 and is connected to the pipe system 13. The sun's rays 18 impinging on the reflectors 10 are focused onto the respective absorber 12 where the energy of the sun's rays is turned into thermal energy. The thermal energy is finally transferred to the heat carrier flowing through the absorber pipe 12 to be stored thereby.

The reflectors 10 combined with the supporting structure 17 to form the collector 11 are carried on a pedestal 20. The points of support are formed by two joints 21 having a horizontal pivot axis 22 and a third joint 23 having a horizontal pivot axis 24. The collector 11 is pivoted about the horizontal axis 22 by actuating an associated system of levers 25. The pedestal 20 of the supporting structure is additionally supported on a base 31 for rotation about a vertical axis 30. This arrangement permits the collector 11 plus pedestal 20 to be swiveled about the vertical axis 30 and additionally about the horizontal axis 22 so that the surfaces of the reflectors 10 track the sun for maximum efficiency of the collector.

In its operating position the collector 11 is in a position in which the reflecting surfaces of the reflectors 10 point substantially upwards. In this operating position the reflecting surfaces are exposed to the deposition of dust and moisture, and also conceivably to hail. The collector 11, being inclined as it is most of the time, also offers a relatively large surface of resistance to prevailing wind currents, which at gusts and elevated wind velocities may damage the apparatus.

To eliminate such risks and combat the deposition of dust, a pivoting mechanism 25 is provided for pivoting the collector 11 through a maximum arc of about 180°. This arc includes a sheltered position in which the reflectors 10 are tilted downwards so that the reflector surfaces point to the ground and only the rear of the reflectors 10 are exposed to the elements. In this position the collector 11 also takes a horizontal, bottommost position in which it is protected from damage by wind and is readily accessible for cleaning and maintenance.

For reasons of balance, the collector 11 is supported centrally on the pedestal 20. So that the collector 11 may be pivoted through the full arc, the collector is provided with a gap 35 which, being arranged between the rows of reflectors 10, extends in a vertical plane through pedestal 20 at right angles to the horizontal axis 22. In order to minimize the gap 35, the pedestal 20 is slimmed as much as possible in a direction normal to said plane.

Figure 2:
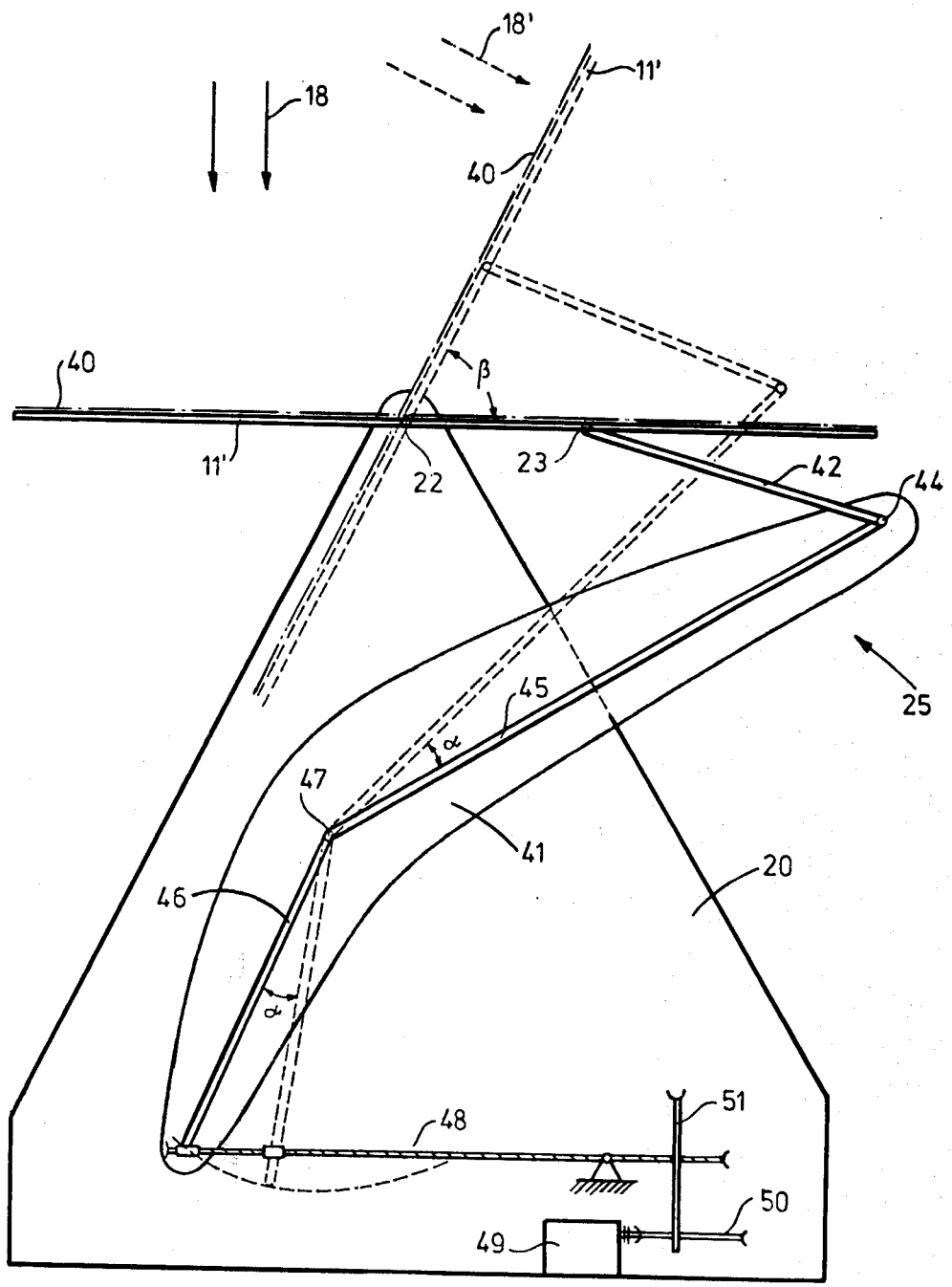
FIGS. 2 and 3 illustrate schematically different positions of pivoting means.

FIG. 2 illustrates in solid line an extreme operating position of the collector 11, which is the horizontal position. The broken lines additionally illustrate an inclined operating position. For clarity the collector 11 is shown here by a plane 11' extending through the horizontal axis 22 at the upper end of the pedestal 20, and the side having the reflector layer is indicated by a dash-dotted line 40. The mechanical portion of the pivoting means comprises a linkage 25 including a first lever 41 and a second lever 42, which is in the form of a thrust rod and is provided with a joint 23 at one end. At its other end 44 the lever 42 is hinged to the first lever 41. The first lever 41 is formed by two arms 45 and 46 rigidly connected one to the other at a certain angle and pivotally supported at point 47 in the pedestal 20. The lever arms 45 and 46 of the boomerang-shaped lever 41 are here shown in the shape of rods for greater clarity of representation. The free end of the first lever 41 is connected to a threaded spindle 48, which in order to actuate the pivoting means is rotated by a motor 49 acting through transfer spindles 50, 51.

Figure 3:
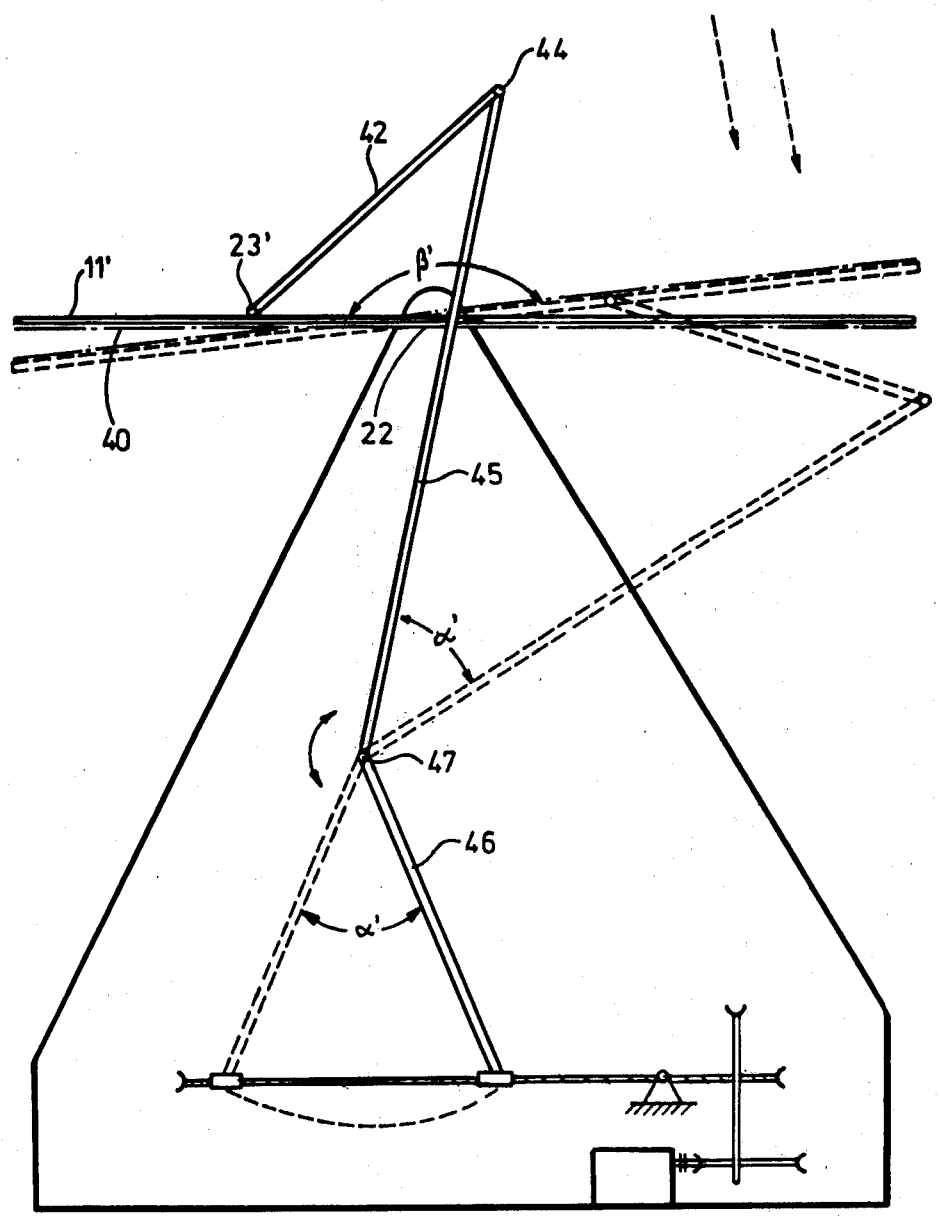

Rotation about the horizontal axis 47 through a modest angle α of the first lever 41, and corresponding displacement of the thrust rod 42, will rotate the plane of the collector 11 about the axis 22 through a greater angle β. When the lever 41 is pivoted still further in a counterclockwise direction, the plane 11' rotates through 180° from the starting position shown in FIG. 2 to reach the sheltered position in which the plane 11' extends horizontally with the reflecting side 40 pointing down. This is the position as illustrated in FIG. 3 by the continuous line. The broken lines show a nearly horizontal operating condition.

The apparatus may be operated by electronic control means, where with the aid of a photosensor or similar means to sense the height of the sun and to supply a conventional control unit with corresponding signals amplified by an amplifier, the collector 11 is oriented continuously and automatically to maintain an optimum position relative to the sun. The pivoting movement about the horizontal axis 22 is controlled in combination with the rotation about the vertical axis 30. In this arrangement the collector 11 can optionally be made to follow warning commands to move it into the protective position in the event of high wind velocities or hail.

It is to be understood that changes and modifications may be made to the above-described embodiment without departing from the spirit and scope of the invention.

What is claimed is:

1. Apparatus for collecting solar energy, comprising:
   a pedestal support;
   a collector member having a solar-energy collector surface and a substantially centrally-located gap having a width substantially equal to the width of said pedestal support, said collector member being supported by said pedestal support for pivotal movement about a horizontal axis over an angle of about 180°, between an exposed position wherein said collector surface is oriented toward the sun and a substantially horizontally oriented sheltered position wherein said collector surface is oriented toward the earth, with said pedestal being engaged by said gap during pivoting into said sheltered position; and
   means for pivoting said collector member between said exposed and sheltered positions about said horizontal axis, said pivoting means being accommodated at least in part within said pedestal and comprising a first double-ended lever comprised of first and second lever arms rigidly connected together at an angle less than 180°, said first lever being pivotably mounted between its ends on said pedestal, a second double-ended lever having its first end pivotably connected to the second end of said first lever and its second end pivotably connected to said collector means, and means for actuating the first end of said first lever to pivot said collector member.

2. Apparatus according to claim 1, further comprising a base and means for mounting said pedestal on said base for rotation about a vertical axis.

3. Apparatus according to claim 1, wherein said pivoting means comprises an electro-mechanical device.

4. Apparatus according to claim 3, wherein said electro-mechanical device is accommodated at least partially within said pedestal.

5. Apparatus according to claim 1, further comprising an electronic control unit for controlling sun-tracking movement of said collector member and being responsive to signals from a warning system to pivot the collector member into said sheltered position.

6. Apparatus according to claim 1, wherein said collector surface comprises energy-reflecting means.

7. Apparatus according to claim 1, wherein said collector surface comprises energy-absorbing means.

8. Apparatus according to claim 1, wherein said actuating means comprises a threaded spindle connected to the first end of said first lever and a motor for rotating said spindle.

* * * * *